(12) United States Patent
Seifert et al.

(10) Patent No.: US 8,876,064 B2
(45) Date of Patent: Nov. 4, 2014

(54) OSCILLATORY VORTICITY GENERATOR AND APPLICATIONS THEREOF

(75) Inventors: Avraham Seifert, Tel-Aviv (IL); Oksana Stalnov, Rishon-LeZion (IL); Ilan Fono, Herzlia (IL); Isaac Dayan, Hod-HaSharon (IL); Victor Troshin, Bat-Yam (IL); Maor Hai Avnaim, Moshav Beit-Gamliel (IL); Vitali Palei, Bat-Yam (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 100 days.

(21) Appl. No.: 13/516,765

(22) PCT Filed: Nov. 23, 2010

(86) PCT No.: PCT/IL2010/000980
§ 371 (c)(1),
(2), (4) Date: Jun. 18, 2012

(87) PCT Pub. No.: WO2011/077424
PCT Pub. Date: Jun. 30, 2011

(65) Prior Publication Data
US 2012/0256056 A1 Oct. 11, 2012

Related U.S. Application Data

(60) Provisional application No. 61/288,386, filed on Dec. 21, 2009.

(51) Int. Cl.
*B64C 21/04* (2006.01)
*B64C 21/06* (2006.01)
*B64C 21/02* (2006.01)
*F01D 5/14* (2006.01)
*F03D 1/06* (2006.01)

(52) U.S. Cl.
CPC ......... *B64C 21/025* (2013.01); *F05B 2240/122* (2013.01); *F05D 2240/127* (2013.01); *Y02E 10/721* (2013.01); *F01D 5/145* (2013.01); *B64C 2230/28* (2013.01); *Y02T 50/166* (2013.01); *B64C 2230/02* (2013.01); *Y02T 50/671* (2013.01); *Y02T 50/673* (2013.01); *F03D 1/06* (2013.01)
USPC .......................................... 244/208; 244/209

(58) Field of Classification Search
USPC ....................................... 244/207–209, 204.1
See application file for complete search history.

(56) References Cited

U.S. PATENT DOCUMENTS 4,363,991 A 12/1982 Edelman
4,697,769 A * 10/1987 Blackwelder et al. ..... 244/199.2
(Continued)

FOREIGN PATENT DOCUMENTS

CN 101334004 12/2008
FR 2852577 9/2004
(Continued)

OTHER PUBLICATIONS

Communication Pursuant to Article 94(3) EPC Dated Jun. 7, 2013 From the European Patent Office Re. Application No. 10796151.8.
(Continued)

*Primary Examiner* — Tien Dinh
*Assistant Examiner* — Michael A Fabula

(57) ABSTRACT

An oscillatory vorticity generator device for controlling the flow on an aero- or hydrodynamic surface of an element, the oscillatory vorticity generator device comprising:
two main walls, positioned opposite to each other, forming a first pair of walls and two other walls, the four walls each having proximal and distal ends, the distal ends connected to an aero- or hydrodynamic surface;
a connection connecting the walls at their proximal ends; and
an opening in the aero- or hydrodynamic surface, the opening being substantially contiguous with the two main walls and the two other walls.

28 Claims, 8 Drawing Sheets

(56) References Cited

U.S. PATENT DOCUMENTS

| | | | |
|---|---|---|---|
| 4,834,610 A | 5/1989 | Bond, III | |
| 5,515,684 A * | 5/1996 | Lucas et al. | 62/6 |
| 5,758,823 A * | 6/1998 | Glezer et al. | 239/4 |
| 5,901,928 A | 5/1999 | Raskob, Jr. | |
| 5,957,413 A * | 9/1999 | Glezer et al. | 244/208 |
| 6,109,566 A | 8/2000 | Miller et al. | |
| 6,123,145 A * | 9/2000 | Glezer et al. | 165/104.33 |
| 6,127,739 A | 10/2000 | Appa | |
| 6,234,751 B1 * | 5/2001 | Hassan et al. | 416/42 |
| 6,267,331 B1 | 7/2001 | Wygnanski et al. | |
| 6,412,732 B1 | 7/2002 | Amitay et al. | |
| 6,425,555 B1 | 7/2002 | Hedeman | |
| 6,457,654 B1 * | 10/2002 | Glezer et al. | 239/4 |
| 6,543,719 B1 * | 4/2003 | Hassan et al. | 244/17.13 |
| 6,644,598 B2 * | 11/2003 | Glezer et al. | 244/208 |
| 6,713,901 B2 * | 3/2004 | Hassan et al. | 310/12.01 |
| 6,722,581 B2 * | 4/2004 | Saddoughi | 239/102.2 |
| 7,280,016 B2 * | 10/2007 | Taya et al. | 335/78 |
| 7,387,491 B2 * | 6/2008 | Saddoughi et al. | 416/62 |
| 7,510,149 B2 * | 3/2009 | Miller et al. | 244/207 |
| 7,637,721 B2 * | 12/2009 | Driver et al. | 416/224 |
| 7,686,256 B2 * | 3/2010 | Miller et al. | 244/207 |
| 7,748,664 B2 * | 7/2010 | Boespflug et al. | 244/208 |
| 7,823,839 B2 * | 11/2010 | Glezer et al. | 244/204.1 |
| 7,874,525 B2 * | 1/2011 | Miller et al. | 244/207 |
| 7,909,575 B2 * | 3/2011 | Barbu et al. | 416/61 |
| 7,967,258 B2 * | 6/2011 | Smith et al. | 244/207 |
| 7,980,516 B2 * | 7/2011 | Birchette | 244/207 |
| 8,038,102 B2 * | 10/2011 | Miller et al. | 244/207 |
| 8,052,069 B2 * | 11/2011 | Xu et al. | 239/102.1 |
| 8,136,767 B2 * | 3/2012 | Cueman et al. | 244/208 |
| 8,235,309 B2 * | 8/2012 | Xu et al. | 239/102.2 |
| 8,303,249 B2 * | 11/2012 | Haans et al. | 416/1 |
| 8,348,200 B2 * | 1/2013 | Saddoughi et al. | 244/208 |
| 8,662,412 B2 * | 3/2014 | Xu et al. | 239/102.2 |
| 2002/0081198 A1 * | 6/2002 | Hassan et al. | 416/90 A |
| 2002/0190165 A1 * | 12/2002 | Glezer et al. | 244/207 |
| 2002/0195526 A1 | 12/2002 | Barrett et al. | |
| 2003/0075615 A1 * | 4/2003 | Saddoughi | 239/102.2 |
| 2004/0067134 A1 | 4/2004 | Beauchamp et al. | |
| 2006/0022092 A1 * | 2/2006 | Miller et al. | 244/200.1 |
| 2006/0140760 A1 * | 6/2006 | Saddoughi et al. | 416/23 |
| 2006/0147325 A1 * | 7/2006 | Vogeley | 417/413.2 |
| 2006/0275122 A1 | 12/2006 | Kilaras | |
| 2007/0003403 A1 | 1/2007 | Pedersen et al. | |
| 2007/0029403 A1 | 2/2007 | Hassan et al. | |
| 2007/0095987 A1 * | 5/2007 | Glezer et al. | 244/200.1 |
| 2007/0152104 A1 * | 7/2007 | Cueman et al. | 244/198 |
| 2007/0231151 A1 | 10/2007 | Herr et al. | |
| 2008/0087771 A1 * | 4/2008 | Boespflug et al. | 244/207 |
| 2008/0197208 A1 * | 8/2008 | Taya et al. | 239/4 |
| 2008/0317598 A1 * | 12/2008 | Barbu et al. | 416/9 |
| 2009/0065649 A1 * | 3/2009 | Babinsky et al. | 244/204 |
| 2009/0074574 A1 | 3/2009 | Godsk et al. | |
| 2009/0097976 A1 | 4/2009 | Driver et al. | |
| 2009/0308980 A1 * | 12/2009 | Miller et al. | 244/207 |
| 2010/0043900 A1 * | 2/2010 | Xu et al. | 137/803 |
| 2010/0044459 A1 * | 2/2010 | Xu et al. | 239/102.2 |
| 2010/0045752 A1 * | 2/2010 | Xu et al. | 347/68 |
| 2010/0071773 A1 * | 3/2010 | Whalen | 137/2 |
| 2010/0135814 A1 * | 6/2010 | Bakhuis et al. | 416/223 R |
| 2011/0139893 A1 * | 6/2011 | Wetzel et al. | 239/102.2 |
| 2011/0162787 A1 * | 7/2011 | Bakhuis et al. | 156/213 |
| 2011/0309201 A1 * | 12/2011 | Hassan et al. | 244/207 |
| 2014/0049970 A1 * | 2/2014 | de Bock et al. | 362/373 |

FOREIGN PATENT DOCUMENTS

| | | |
|---|---|---|
| WO | WO 00/50778 | 8/2000 |
| WO | WO 02/072421 | 9/2002 |
| WO | WO 2008/069937 | 6/2008 |
| WO | WO 2008/113349 | 9/2008 |
| WO | WO 2009/056136 | 5/2009 |
| WO | WO 2009/080316 | 7/2009 |
| WO | WO 2011/077424 | 6/2011 |

OTHER PUBLICATIONS

International Preliminary Report on Patentability Dated Jul. 5, 2012 From the International Bureau of WIPO Re. Application No. PCT/IL2010/000980.

International Search Report and the Written Opinion Dated Mar. 11, 2011 From the International Searching Authority Re. Application No. PCT/IL2010/000980.

Yehoshua et al. "Active Boundary Layer Tripping Using Oscillatory Vorticity Generator", Aerospace Science and Technology, 10: 175-180, 2006.

Yehoshua et al. "Boundary Condition Effects on the Evolution of a Train of Vortex Pairs in Still Air", The Aeronautical Journal, Jul. 2006, p. 397-417.

Notification of Office Action Dated Mar. 5, 2014 From the State Intellectual Property Office of the People's Republic of China Re. Application No. 201080058915.8 and Its Translation Into English.

Search Report Mar. 5, 2014 From the State Intellectual Property Office of the People's Republic of China Re. Application No. 201080058915.8.

* cited by examiner

OSCILLATORY VORTICITY GENERATOR AND APPLICATIONS THEREOF

RELATED APPLICATIONS

This application is a National Phase of PCT Patent Application No. PCT/IL2010/000980 having International filing date of Nov. 23, 2010, which claims the benefit of priority under 35 USC §119(e) of U.S. Provisional Patent Application No. 61/288,386 filed on Dec. 21, 2009. The contents of the above applications are all incorporated herein by reference as if fully set forth herein.

FIELD AND BACKGROUND OF THE INVENTION

The present invention, in some embodiments thereof, relates to oscillatory vorticity generation on aero- or hydrodynamic surfaces and, more particularly, but not exclusively, to oscillatory vorticity generation at airfoils such as on aircraft wings or wind turbine blades.

Several methods are known in the art for actively manipulating fluid flow over a surface. One method widely used employs active flow control to increase turbulence, and more specifically certain relevant scales of turbulence, on the aerodynamic surfaces, for example by use of synthetic jet actuators.

US 2007/0095987 to Glezer et al. discloses a synthetic jet actuator including a jet housing that incorporates an internal chamber with a volume of fluid and a small orifice in one dimension of the chamber connecting the internal chamber to an external environment having the fluid to be controlled. The synthetic jet actuator disclosed is operative to periodically change the volume within the internal chamber such that a synthetic jet stream entrained by a series of fluid vortices is generated and projected to the external environment.

US 2007/152104 to Cueman et al., for example discloses an array of synthetic jet actuators integrated in various applications, such as in aircraft engines or wings. Each actuator includes a chamber, a flow control port (a small orifice in one dimension of the chamber) and opposite parallel side walls configured to expand apart and contract together to flow a control fluid through the flow control port in response to an input.

US 2003/075615 to Saddoughi discloses a synthetic jet actuator disposed in a wall of a flow-path, such as an airfoil. The synthetic jet actuator consists of a rectangular cavity in the wall wherein the open side of the cavity is covered by an actuator blade such that a small orifice is left in the covered opening.

Additional background art includes WO 08/113,349 by Godsk, K. B., U.S. Pat. No. 5,758,823 to Wiltse, J. et al., U.S. Pat. No. 6,412,732 to Amitay, M. et al. and US 2006/140760 to Philippe G.

SUMMARY OF THE INVENTION

An aspect of some embodiments of the invention refers to a retrofit device for an aero- or hydrodynamic surface, such as an aircraft wing or a wind turbine blade. In some embodiments, the retrofit device comprises a plurality of oscillatory vorticity generators and optionally one or more sensors and/or controllers. Optionally, the retrofit device comprises a closed loop-system including wires and tubes and is adapted to fit on a surface, for example, an aerodynamic surface.

An aspect of some embodiments of the invention refers to an oscillatory vorticity generator comprising a cavity, the cavity having five walls and an uncovered open side, to wherein at least one of the walls comprises an active element for producing oscillatory vortices.

An aspect of some embodiments of the invention refers to a wedge shaped oscillatory vorticity generator, wherein at least one of the walls of the wedge comprises an active element for producing oscillatory vortices.

The vorticity generators of the second and third aspects of the invention may be used in the first aspect. Alternatively, other vorticity generators, other type of sensors and other types of controllers, as known in the art, may be used, depending on their size and the room available in the retrofit device.

An aspect of some embodiments of the invention relates to an aircraft having a wing or other surface thereof or to a wind turbine having blades which are fitted with one or more oscillatory vorticity generators or a retrofit device in accordance with various aspects of the invention.

According to an aspect of some embodiments of the present invention there is provided an oscillatory vorticity generator device for controlling the flow on an aero- or hydrodynamic surface of an element, the oscillatory vorticity generator device comprising:

two main walls, positioned opposite to each other, forming a first pair of walls and two other walls, the four walls each having proximal and distal ends, the distal ends connected to an aero- or hydrodynamic surface;

a connection connecting the walls at their proximal ends; and an opening in the aero- or hydrodynamic surface, the opening being substantially contiguous with the two main walls and the two other walls.

According to some embodiments of the invention, a piezoelectric actuator is mounted on one of the two main walls. According to some embodiments of the invention, a piezoelectric actuator is mounted on each of the two main walls According to some embodiments of the invention, the distance between the main walls is between 0.1 mm and 10 mm Optionally, the distance between the main walls is between 0.5 mm and 1.5 mm Optionally, the distance between the main walls is about 1 mm According to some embodiments of the invention, the two main walls are substantially parallel. According to some embodiments of the invention, the two main to walls are substantially non-parallel.

According to some embodiments of the invention, the aero- or hydrodynamic surface is an airfoil.

According to an aspect of some embodiments of the present invention there is provided a wedge shaped oscillatory vorticity generator device for controlling the flow on an aero- or hydrodynamic surface, the oscillatory vorticity generator comprising:

two main walls, positioned opposite to each other, forming a first pair of walls and two other walls, the four walls having a proximal end and a distal end, the distal ends positioned at an aero- or hydrodynamic surface;

a connection connecting the walls at their proximal ends; and at least one piezo-electric actuator mounted on at least one of the main walls.

According to some embodiments, the connection comprises a proximal wall.

According to some embodiments of the invention, the oscillatory vorticity generator further comprises a bonding element connecting the main walls at their distal end. Optionally, the bonding element comprises glue.

According to some embodiments, the main walls are substantially non-parallel.

According to an aspect of some embodiments of the present invention there is provided a retrofit device for an aero- or hydrodynamic surface, the retrofit device comprising:

a front surface and a rear surface, the rear surface adapted to fit on an aero- or hydrodynamic surface;

one or more oscillatory vorticity generators associated with the front surface; and fasteners adapted to attach the retrofit device to an existing aero- or hydrodynamic surface.

According to some embodiments of the invention, the fasteners comprise a sleeve adapted to fit over the aero- or hydrodynamic surface. According to some embodiments of the invention, the fasteners comprise screws, glue, magnets or silicon.

According to some embodiments of the invention, at least one of the oscillatory vorticity generators is an oscillatory vorticity generator according to any of the embodiments described above.

According to an aspect of some embodiments of the invention there is provided a to retrofit device for an aero- or hydrodynamic surface, the retrofit device comprising:

a front surface and a rear surface, the rear surface adapted to fit on an aero- or hydrodynamic surface;

one or more oscillatory vorticity generators according to any of the embodiments described above.

According to some embodiments of the invention, the retrofit device further comprises one or more sensors for sensing the flow on the aero- or hydrodynamic surface.

According to some embodiments of the invention, the retrofit device further comprises one or more controllers for controlling the oscillatory vorticity generators.

According to some embodiments of the invention, the retrofit device further comprises conduits beneath the front surface to connect power to the oscillatory vorticity generators.

According to some embodiments of the invention there is provided a blade fitted with one or more retrofit devices according to any of the embodiments described above or one or more vorticity generators according to any of the embodiments described above.

According to some embodiments of the invention there is provided a wind turbine having a plurality of wind turbine blades one or more of which are blades according to any of the embodiments described above.

According to some embodiments of the invention there is provided an aircraft having an aerodynamic surface the surface being fitted with one or more retrofit devices according to any of the embodiments described above or one or more vorticity generators according to any of the embodiments described above.

According to some embodiments of the invention, an angle of at least one of the oscillatory vorticity generators is perpendicular to the aero- or hydrodynamic surface. According to some embodiments of the invention, an angle of at least one of the oscillatory vorticity generators is between 10° to 170° to the surface.

According to some embodiments of the invention, at least one of the oscillatory vorticity generators are adapted to generate vortices for increasing turbulence on the aero- or hydrodynamic surface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
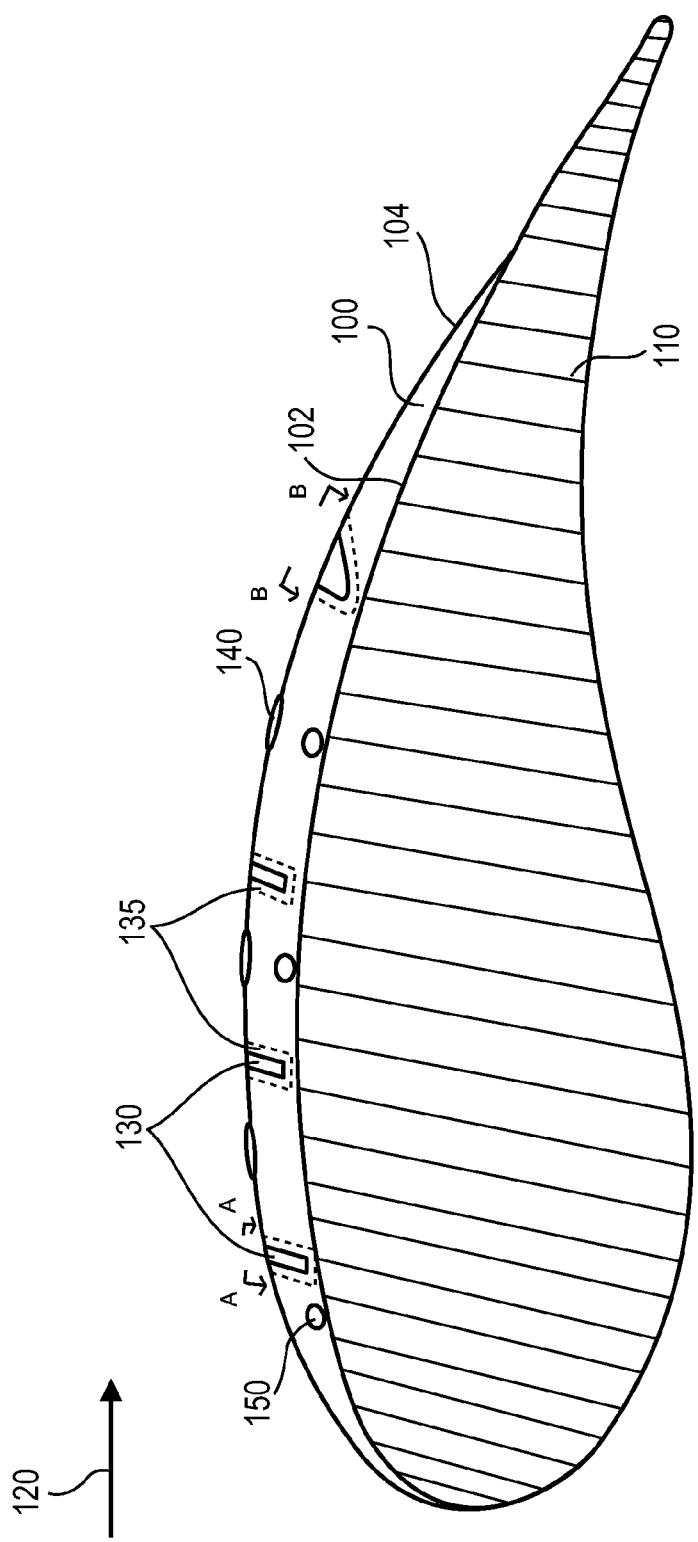
FIG. 1 is a schematic illustration of a retrofit device according to some embodiments of the invention.

The present invention, in some embodiments thereof, relates to oscillatory vorticity generation on aero- or hydrodynamic surfaces and, more particularly, but not exclusively, to oscillatory vorticity generation at airfoils such as on aircraft wings or wind turbine blades.

An aspect of some embodiments of the invention refers to a retrofit device for airfoils, such as an aircraft wing or a wind turbine blade. In some embodiments, the retrofit device comprises a plurality of oscillatory vorticity generators for increasing turbulence on the airfoil and optionally improving the start-up performance and operation in both unsteady and steady flows and/or at degraded surface quality conditions. The oscillatory vorticity generators may be any steady or oscillatory vorticity generators known in the art or one of more of the oscillatory vorticity generators described below. A single retrofit device may include one or more types of oscillatory vorticity generators.

In some embodiments, the retrofit device further includes one or more sensors and/or controllers for controlling the operation of the oscillatory vorticity generators. Optionally, the retrofit device comprises a closed loop-system and/or does not require electronic or other connections to the original airfoil itself. In some embodiments, the retrofit device will also generally include hollows or conduits for wires and tubes to connect electricity or other type of input or power to the oscillatory vorticity generators and/or sensors and controllers for receiving signals from the sensors.

Optionally, wireless communication is applied to the retrofit device for coordinating between the components on the retrofit device. Optionally, power to the retrofit device is provided by ultrasound, microwave or other type of wireless energy transfer mechanism.

In some embodiments, the retrofit device has a flat or curved shape conforming to the shape of the airfoil to which it will be fixed. Optionally, the retrofit device comprises fasteners for mounting the retrofit device on the airfoil. In some embodiments, the retrofit device is designed as a glove that covers the entire airfoil. This allows for simple mounting of the retrofit device on the airfoil and/or for holding the retrofit device in place. Alternatively, the retrofit device is mounted on one surface of the airfoil only, preferably on the surface having the highest tendency for flow to separation. Optionally, the retrofit device is screwed or glued to the airfoil. Optionally, the retrofit device is designed to fit on surfaces of already existing and installed aero- or hydrodynamic devices without requiring major design modifications to the aero- or hydrodynamic devices and airfoils. Optionally, the retrofit device is thin so that it does not substantially add to the cross-section of the airfoil.

An aspect of some embodiments of the invention refers to an oscillatory vorticity generator adapted to be integrated in an airfoil or in a retrofit device as described above. In some embodiments, the oscillatory vorticity generator comprises a substantial rectangular shaped cavity having two substantially parallel longitudinal walls and two other substantially longitudinal walls having a proximal and a distal end and a connection such as a latitudinal wall connecting the longitudinal walls at the proximal ends thereof. The distal ends of the walls are preferably connected to the airfoil in which an opening is provided, the opening being substantially contiguous with the four longitudinal walls.

In some embodiments, one or both of the longitudinal walls comprise active elements, such as piezo-electric or magnetic actuators or any other device, method or mechanism capable of generating oscillatory pressures in the cavity.

In the prior art, synthetic jet actuators have been designed with a rectangular chamber having six walls for forming a cavity, with an orifice in one of the walls for releasing vortices at the airfoil surface. The prior art required six walls in order to form a resonant cavity to provide substantial vortices with low input power and/or small displacement of the cavity walls. The inventors of the present application have found that if two opposite longitudinal walls are placed close enough to each other, vortices will be generated even when there is no perforated wall at the side opening to the exterior of the airfoil. Without being limited by any theory, applicants believe that when the opening in distance between the opposite walls is small enough, the air at the opening acts to form a resonant cavity by virtue of its resistance to flow.

In some embodiments, the distance between the longitudinal walls of the oscillatory vorticity generator is between 0.1 mm-10 mm Optionally, the distance is between 0.5 mm-5 mm or 0.5 mm-1.5 mm, for example about 1 mm An aspect of some embodiments of the invention refers to a wedge shaped oscillatory vorticity generator adapted to be integrated in an airfoil or in a retrofit device to as described above. A "wedge shape" as used herein refers to a shape of a triangle or trapezium, where two opposite longitudinal walls of the oscillatory vorticity generator are not parallel to each other.

The wedge comprises two opposite substantially non-parallel longitudinal walls and two other substantially longitudinal walls having a distal end and a proximal end, wherein the distal end is positioned at the surface of the airfoil (or the retrofit device), facing the flow. Optionally, the longitudinal walls are connected at their distal end by a distal latitudinal wall, which may be, for example, substantially parallel to the airfoil surface. Optionally, an orifice is made in the distal latitudinal wall for release of the generated vortices. Alternatively, if at least two of the longitudinal walls are placed close enough to each other, no latitudinal wall is present at the distal end as described above with respect to the rectangular cavity.

In some embodiments, the longitudinal walls are connected to each other at their proximal ends, optionally by a bonding element. Optionally, the bonding element is glue or other type of bonding means. Alternatively, the bonding element is a proximal longitudinal wall for connecting the proximal ends of the longitudinal walls to each other. A bonding element may be preferred for example when the longitudinal walls are rectangular, the area of the rectangles facing each other.

In some embodiments, one or two of the longitudinal walls of the wedge comprise an active element, such as a piezo-electric or magnetic actuator or any other device capable of generating oscillatory pressures in the cavity. The active elements are preferably mounted on the opposite walls of the wedge which are not parallel.

An aspect of some embodiments of the invention refers to a surface of a hydro- or aerodynamic device comprising one or more oscillatory vorticity generators according to the embodiments described above and below. Optionally, the surface is an airfoil such as a wing of an aircraft or a blade of a wind turbine.

In some embodiments of the invention, the oscillatory vorticity generators are positioned such that the angle of the oscillatory vorticity generators are perpendicular to the direction of flow. Alternatively, the oscillatory vorticity generators may be positioned at an angle to the direction of flow, as known in the art. For example, as described in Yehoshua and Seifert, "Active Boundary Layer Tripping Using Oscillatory to Voracity Generator", Aerospace Science and Technology 10 (2006) 175-180 or Yehoshua and Seifert, "Boundary Condition Effects on the Evolution of a Train of Vortex Pairs in Still Air", The Aeronautical Journal, July 2006, 397-417, the disclosures of which are incorporated herein by reference.

As referred herein "the angle of the oscillatory vorticity generators" refers to an angle between a median of the oscillatory vorticity generators and the surface of the airfoil or retrofit device facing the flow. Median refers to a substantially longitudinal plane between the longitudinal walls, equidistant from the walls.

These positions of the oscillatory vorticity generators apply to all the aspects of the invention described above and detailed below.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 illustrates a retrofit device 100 according to some embodiments of the invention.

As shown in the figure, retrofit device 100 is fit on a wind turbine blade 110. It is noted that retrofit devices according various embodiments of the invention are adapted to fit on any surface, external or internal to any flow related system, such as aero- or hydrodynamic surfaces including aircraft wings, fuselages, helicopter blades and wind turbine blades. Retrofit device 100 preferably provides capabilities to alter the flow.

Figure 8:
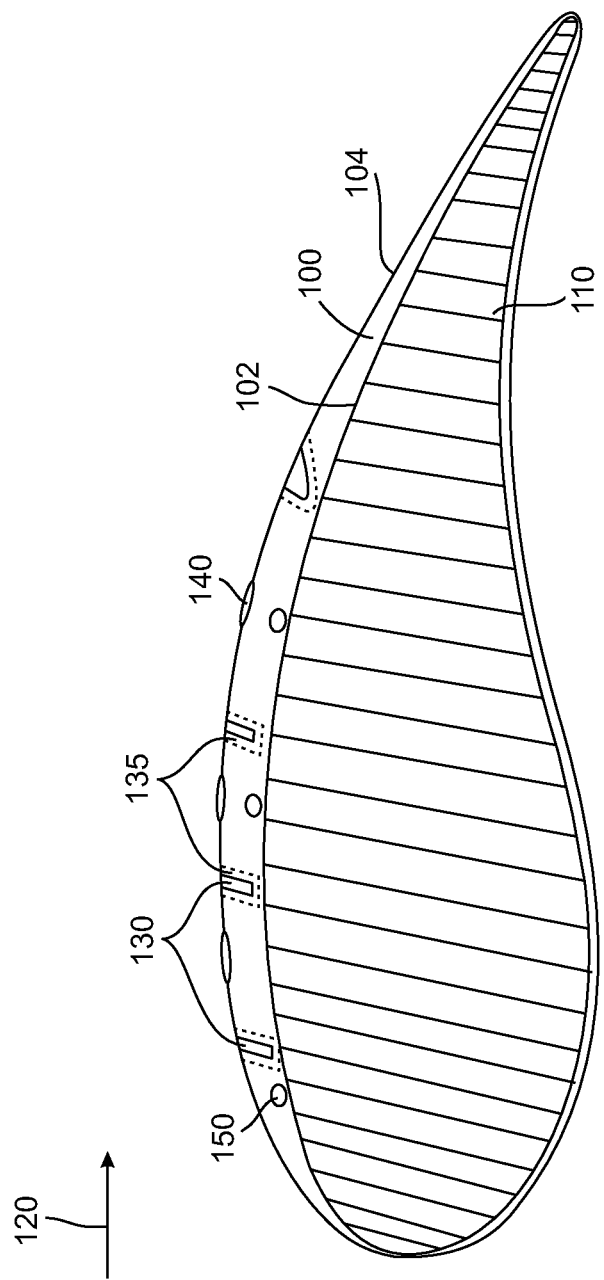
FIG. 8 is a schematic illustration of the retrofit device of FIG. 1 shaped as a sleeve according to some embodiments of the invention.
Figure 9:
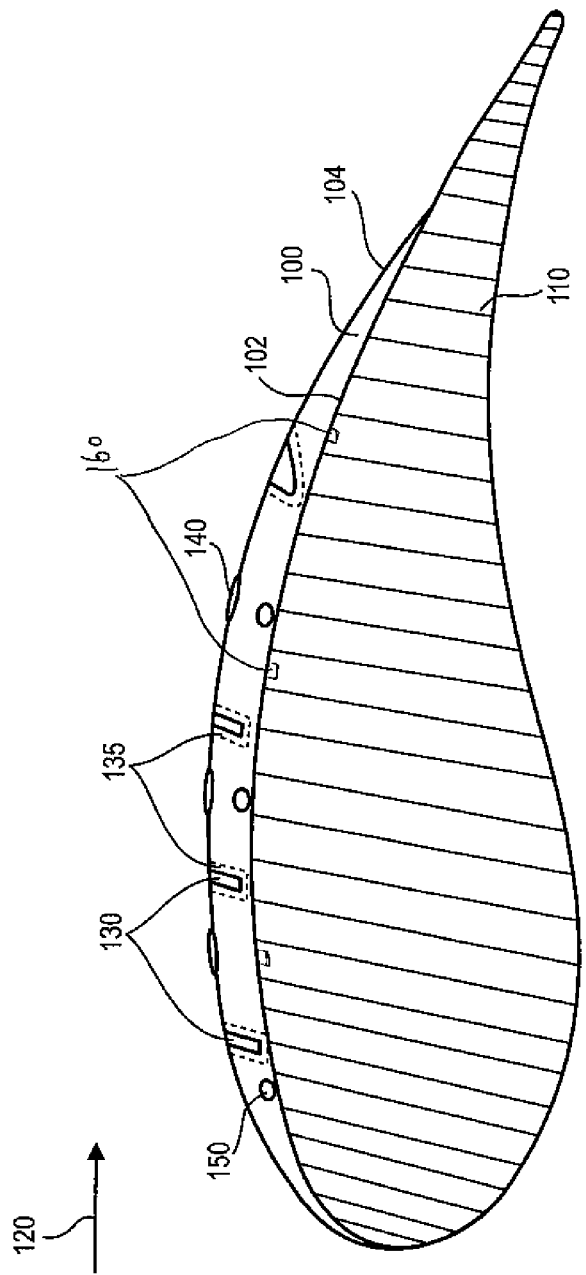
FIG. 9 is a schematic illustration of the retrofit device of FIG. 1 fastened to the airfoil by screws, glue, magnets, silicon, belts or the like according to other embodiments of the invention.

Retrofit device 100 can fit onto the surface of a blade or other surface having a tendency for flow separation during operation, for example a blade of a wind turbine. The shape of a rear face 102 of retrofit device 100 preferably conforms to the shape of the upper surface of blade 110, which is optionally curved. According to some embodiments, retrofit device 100 (or rear face 102) includes fasteners (160) to attach device 100 to airfoil 110. Optionally, device 100 is designed as a glove that covers the entire airfoil, as shown in FIG. 8. Alternatively, the fasteners comprise screws, glue, magnets, silicon, belts or any other suitable attachment means as shown in FIG. 9.

Preferably, device 100 is made of material that is durable and is resistant to the to flow, such as airflow, and environmental effects.

Retrofit device 100 is optionally adapted to fit on surfaces of already existing and installed aerodynamic devices without requiring major design modifications to the aerodynamic devices and airfoils.

Preferably, retrofit device 100 is thin so that it does not substantially add to the cross-section of the airfoil. Optionally, the thickness of device 100 may be between 1%-10% of the chord of blade 110. For example, the thickness of device 100 may be between 1 mm-5 cm. Optionally, device 100 is light and does not substantially add to the weight of airfoil 110.

Retrofit device 100 provides control of flow, such as airflow, on the wind turbine blade or other aero- or hydrodynamic surface. The flow is indicated in the figure as arrow 120. Retrofit device 100 comprises one or more oscillatory vorticity generators 130 for generating vortices near the surface of the blade. The generated vortices optionally assist in increasing turbulence, skin friction, mass, momentum and/or heat transfer across the boundary layer. Optionally, the generated vortices improve the start-up performance and operation of clean and contaminated surfaces in both unsteady and steady flows.

Oscillatory vorticity generators may be any oscillatory vorticity generators known in the art or one or more of the oscillatory vorticity generators depicted in FIGS. 2-4 and described below. Retrofit device 100 may include one or more types of oscillatory vorticity generators.

Oscillatory vorticity generators 130 are optionally positioned with an opening at a front surface 104 of device 100. Optionally, the angle of the oscillatory vorticity generators are between 10° to 170° (i.e. between 10° upstream or downstream facing or cross-stream) to front surface 104 or for example, perpendicular to front surface 104 or to the direction of flow 120.

Optionally, retrofit device 100 further includes sensors 140 adapted to sense the state of the flow. Sensors 140 are preferably positioned on front surface 104, facing the flow. Optionally, the amount of near-wall vorticity is controlled based on the sensed flow. When the sensors determine that the near wall vorticity is low, signifying a possible onset of separation, the vorticity introduced by the vorticity generators is increased.

Optionally, retrofit device 100 further includes controllers 150 for controlling the generation of oscillatory vortices by the oscillatory vorticity generators, for example according to inputs received from the sensors or unrelated to any sensor measurement. In some embodiments, a controller controls a plurality of oscillatory vorticity generators. Alternatively, each oscillatory vorticity generator has a separate controller. Each controller 150 may receive inputs from one or more sensors 140.

In some embodiments, retrofit device 100 comprises hollows or conduits 135 for wires and tubes for providing connection to and/or between oscillatory vorticity generators 130 and/or sensors 140 and/or controllers 150. Optionally, conduits 135 are also used to connect electricity to the components of device 100. Conduits 135 are illustrated around oscillatory vorticity generators 130 which may also provide space for oscillatory vorticity generators 130 to oscillate freely. However, it is noted that according to exemplary embodiments, conduits 135 may be located anywhere in retrofit device 100 and in any direction with respect to the surface of airfoil 110.

Figure 2A:
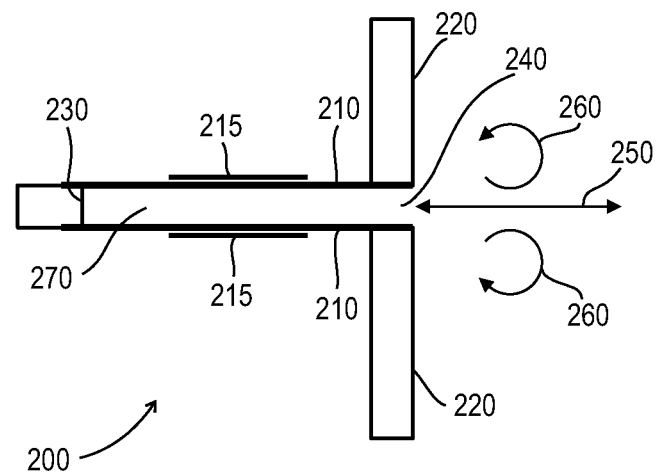
FIGS. 2A and 2B are schematic illustrations of a cross section of an oscillatory vorticity generator taken substantially on line A-A of FIG. 1 according to some embodiments of the invention.
Figure 2B:
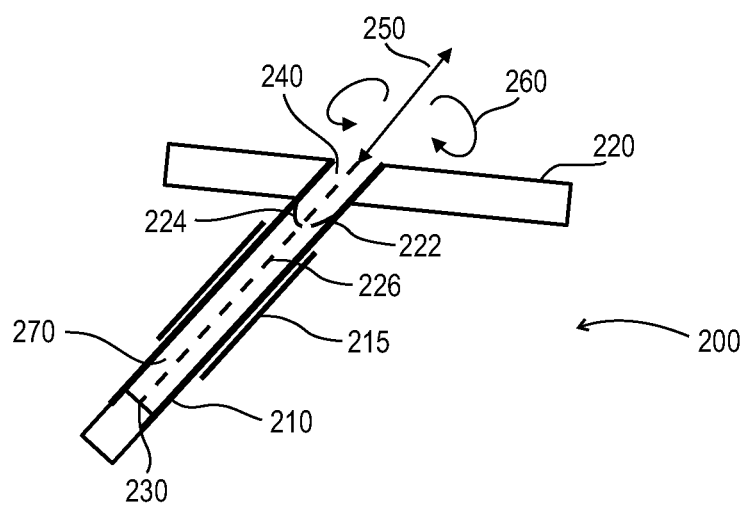

FIGS. 2A and 2B are schematic illustrations of a cross section of an oscillatory vorticity generator 200 according to some embodiments of the invention. Oscillatory vorticity generator 200 comprises two opposite longitudinal walls 210 having a distal end connected to a surface of an airfoil 220. A connection such as a latitudinal wall or plug 230 connects walls 210 at their proximal ends. Walls parallel to the plane of the figure (not shown) close the cavity. Walls 210 are preferably substantially parallel so as to create a rectangular oscillatory vorticity generator, although other shapes are possible.

In some embodiments, oscillatory vorticity generator 200 is an integral part which is screwed or bonded to airfoil surface 220. Optionally, as shown in FIG. 2A, the angle of the oscillatory vorticity generators 200 is substantially perpendicular to surface 220 for example, about 90°±30°. Alternatively, any other suitable angle may be used. For example, FIG. 2B shows oscillatory vorticity generator 200 positioned at an angle. A median 226 of oscillatory vorticity generator 200 is shown, with an angle 224 between the left side of median 226 and surface 220 and an angle 222 between the right side of median 226 and surface 220. In FIG. 2B, angles 224 and 222 differ substantially in size. Angles 222 and 224 may vary between 10° and 170° each. Walls 210 may have a same of different lengths according to embodiments of the invention. Using a smaller angle (224 or 222) generally requires less depth in the airfoil or retrofit device than for near perpendicular mounting.

In the prior art, oscillatory vorticity generators have a latitudinal wall at the end opening to the exterior of the airfoil, with a small orifice or narrow slot for forming a cavity and for releasing vortices at the airfoil surface. The prior art believed that six walls were required in order to form a resonant cavity to provide substantial vortices with low input power and small amplitude wall displacement. The inventors of the present application have found that if longitudinal walls 210 are placed closed enough to each other, vortices will be generated even when there is no perforated wall at the distal side connected to airfoil surface 220. The walls parallel to the plane of the figure can be further apart.

Accordingly, an opening 240 is created between two longitudinal walls 210 at the end opening to the exterior of the airfoil, allowing an airflow 250 to flow there through. Without being limited by any theory, applicants believe that when opening 240 is small enough, the motion of air at the opening creates enough resistance to flow to form a resonant cavity 270 by virtue of its resistance to flow. Opening 240 (or the distance between walls 210) is optionally between about 0.1 mm-10 mm large, preferably between 0.5 mm-1.5 mm, such as 1 mm It is noted that a small distance between walls 210 results in a relatively small oscillatory vorticity generator 200 which can fit in or on small devices, such as a retrofit device 100 depicted in FIG. 1, especially when mounted at an angle to the airfoil surface. Optionally, oscillatory vorticity generator 200 is between 3 mm-10 mm thick, between 10 mm-60 mm long and between 10 mm-60 mm deep.

Optionally, an active element is mounted on one or both of longitudinal walls 210, for example a piezoelectric actuator 215. In some embodiments, actuators 215 are magnetic actuators. Actuators 215 are optionally made of two opposing and mating parts attached to each other. Actuators 215 act to generate pressure variations within the vorticity generator which causes vortices 260 to be generated outside the opening for controlling the flow on surface 220. When alternating voltage is applied to actuators 215, the volume of cavity 270 changes and oscillatory pressure is produced inside cavity 270. In some embodiments, actuators 215 generate oscillatory pressure at or near the resonance of the cavity. Actuators 215 optionally act at frequencies between 100 Hz to 5 KHz. Optionally, actuators 215 are controlled by a controller, as shown and detailed with respect to FIG. 1 above. Actuators 215 preferably operate in phase and at the same frequency for gaining maximum momentum. However, in some embodiments, actuators 215 operate at different frequencies to generate complex waveforms. Alternatively, amplitude or pulsed modulation signals are provided to actuators 215.

Figure 3A:
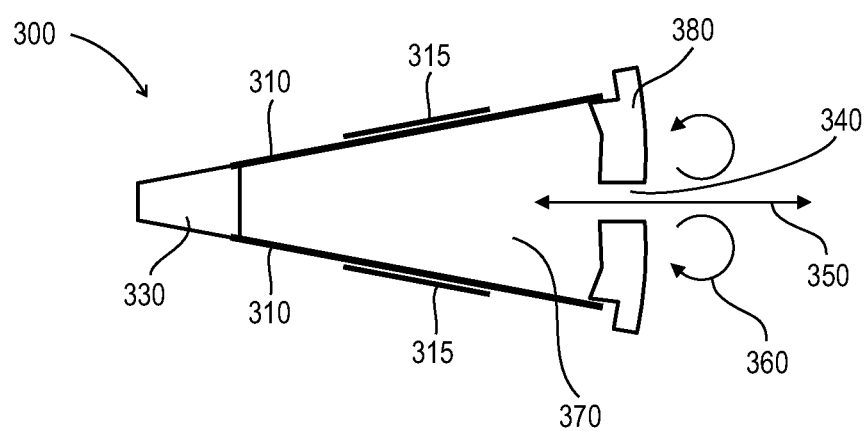
FIGS. 3A-3C are schematic illustrations of a cross section of an oscillatory vorticity generator taken substantially on line B-B of FIG. 1 according to other embodiments of the invention.
Figure 3B:
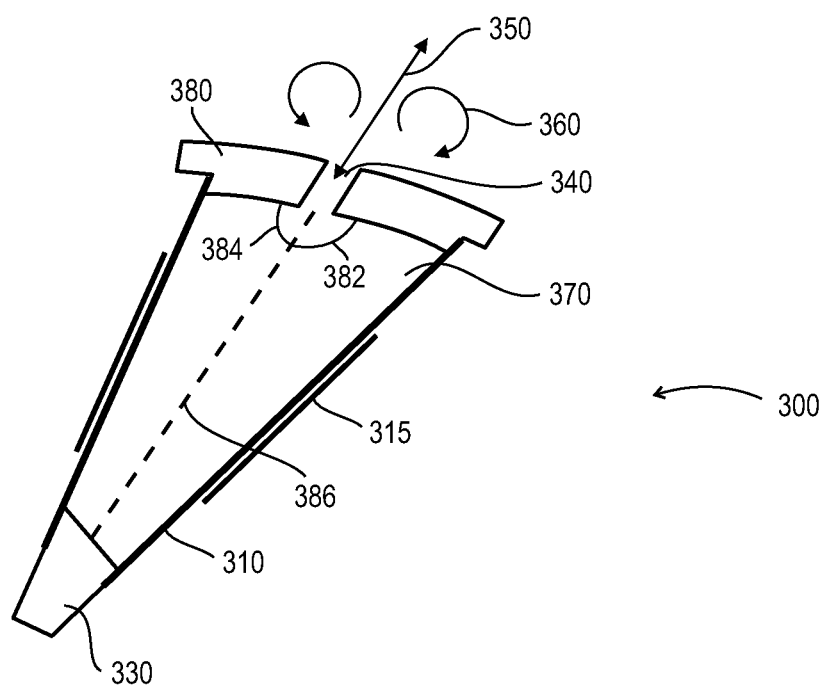
Figure 3C:
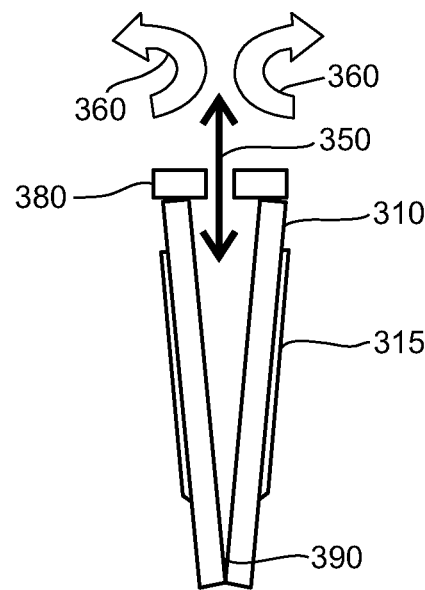

In some embodiments, actuators 215 are relatively thin and do not add substantially to the thickness (or diameter) of oscillatory vorticity generator 200. Optionally, actuators 215 have a thickness of about 0.5 mm FIGS. 3A-3C are schematic illustrations of a cross section of an oscillatory vorticity generator 300 according to another exemplary embodiment of the invention. Oscillatory vorticity generator 300 includes two longitudinal walls 310 which are preferably not parallel to each other so as to create a wedge shape. Optionally, a bonding element, such as latitudinal wall 330 is positioned between walls 310 at the narrow side of the wedge. Alternatively, walls 310 are attached to each other at the narrow side of the wedge, as shown in FIG. 3C. A bonding element, such as glue 390 connects the proximal ends of walls 310 to each other.

In some embodiments, a latitudinal wall 380 connects between walls 310 at the wide side of the wedge. Optionally, wall 380 is a hydro- or aerodynamic surface, such as an airfoil. Alternatively, wall 380 is attached to a hydro- or aerodynamic surface. An opening 340 in wall 380 is provided for releasing vortices from the cavity. Airflow 350 flows through opening 340.

Optionally, when walls 310 are positioned close enough to each other, no latitudinal wall 380 is required and opening 340 is an opening at the distance of walls 310.

The wedge shape of oscillatory vorticity generator 300 optionally results in a relatively small oscillatory vorticity generator which is adapted to fit in small hydro- or aerodynamic surfaces or in a retrofit device as shown in FIG. 1.

In some embodiments, as shown in FIG. 3A, oscillatory vorticity generator 300 is positioned such that the angle of oscillatory vorticity generator 300 is substantially perpendicular to latitudinal wall or surface 380, i.e. the angles between each of walls 310 to and surface 380 are substantially equal. Alternatively, as shown in FIG. 3B for example, vorticity generator 300 is positioned at an angle from surface 380. Angles 382 and 384 in FIG. 3B indicate the angles between a median 386 of generator 300 with respect to surface 380. Angles 382 and 384 may vary between 10° and 170°. Optionally, angles 382 and 384 are substantially different. Optionally, walls 310 are of a same length. Alternatively, walls 310 have different lengths.

While FIGS. 3A-3C show wedge shaped cavity 370 with its wide side facing surface 380, in some embodiments of the invention, wedge shaped cavity 370 is positioned with its narrow side facing surface 380.

An actuator 315 is mounted on one or both of walls 310. Actuators 315 are adapted to generate vortices 360 and are optionally similar to actuators 215 shown and described with respect to FIG. 2 above.

Figure 4:
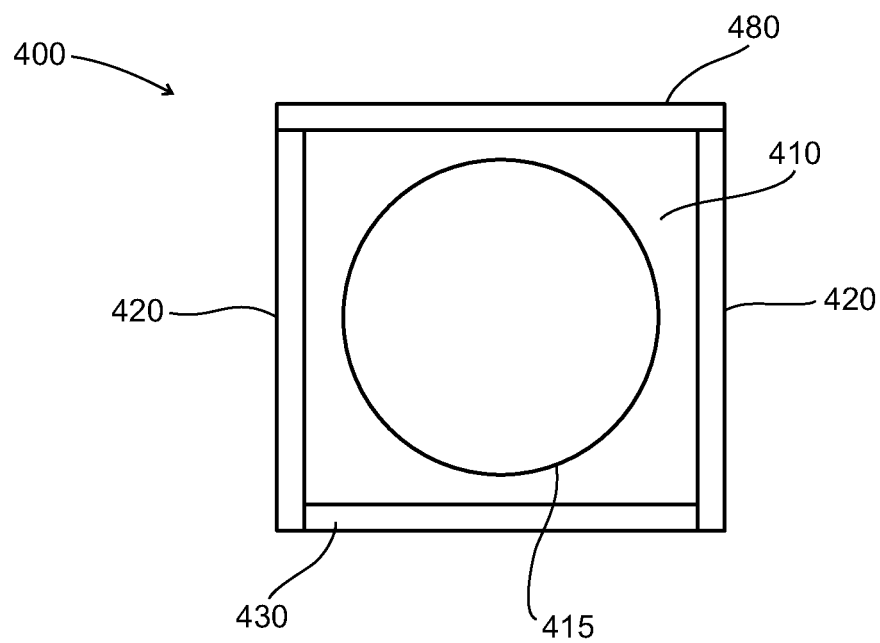
FIG. 4 is a schematic illustration of a side view of an oscillatory vorticity generator according to some embodiments of the invention.

FIG. 4 is a side view of an oscillatory vorticity generator 400 according to an exemplary embodiment of the invention. A wall 410 is shown, having an active element 415 attached thereto, optionally having the shape of a disk. Wall 410 is optionally similar to walls 210 or 310 shown in FIG. 2 or 3 respectively. Oscillatory vorticity generator 400 further comprises of two longitudinal walls 420 connecting wall 410 with a similar wall positioned opposite to wall 410. Oscillatory vorticity generator 400 further optionally comprises a proximal latitudinal wall 430 for connecting walls 410 and 420 at their proximal end. Alternatively, wall 430 may be any other type of bonding means, such as glue or silicon. A distal wall 480 is optionally provided for connecting walls 410 and 420 at their distal end. Alternatively, distal wall 480 may be a hydro- or aerodynamic surface to which walls 410 and 420 are connected. In some embodiments, as for example shown in FIG. 2, no distal wall 480 is present.

Figure 5:
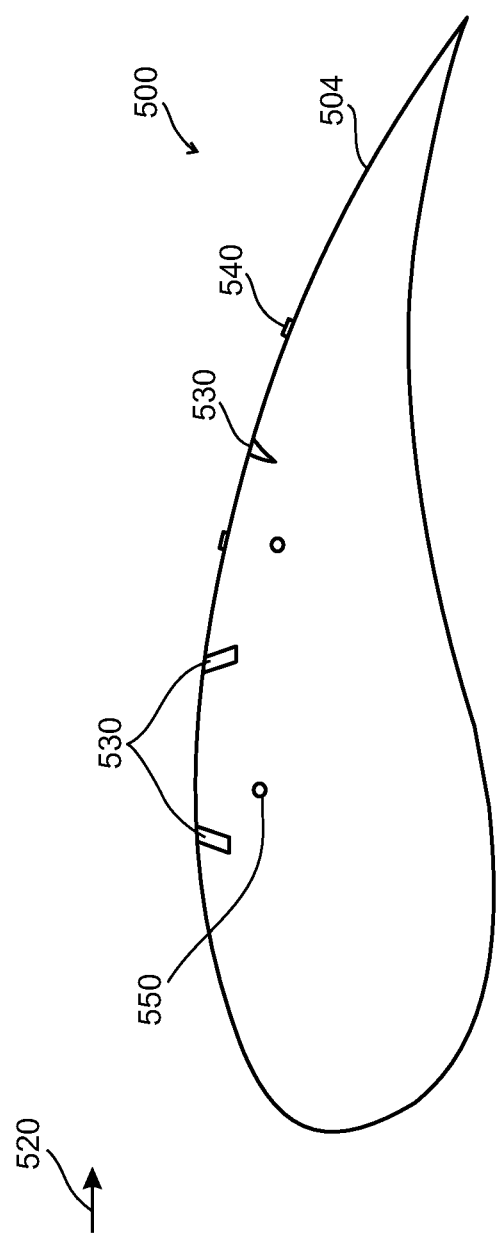
FIG. 5 is a schematic illustration of an airfoil according to some embodiments of the invention.

FIG. 5 is a schematic illustration of a hydro- or aerodynamic surface 500 according to some embodiments of the invention. Optionally, hydro- or aerodynamic surface 500 is an airfoil. Airfoil 500 comprises an upper (or "suction") surface 504 facing the flow, marked as an arrow 520. Optionally, one or more oscillatory vorticity generators 530 are positioned at or near upper surface 504. Optionally, one or more of the oscillatory vorticity generators 530 are oscillatory vorticity generators according to the embodiments shown and described with respect to FIG. 2. Alternatively or to additionally, one or more of oscillatory vorticity generators 530 are wedge-shaped oscillatory vorticity generators as shown and described with respect to FIG. 3.

Optionally, airfoil 500 further comprises one or more sensors 540 adapted to sense the state of the flow. Sensors 540 are preferably positioned on upper surface 504, facing the flow. Optionally, airfoil 500 further includes controllers 550 for controlling the generation of oscillatory vortices by oscillatory vorticity generators 530, for example according to inputs received from sensors 540 or unrelated to any sensor measurement. In some embodiments, a controller controls a plurality of oscillatory vorticity generators. Alternatively, each oscillatory vorticity generator has a separate controller. Each controller 550 may receive inputs from one or more sensors 540.

Figure 6:
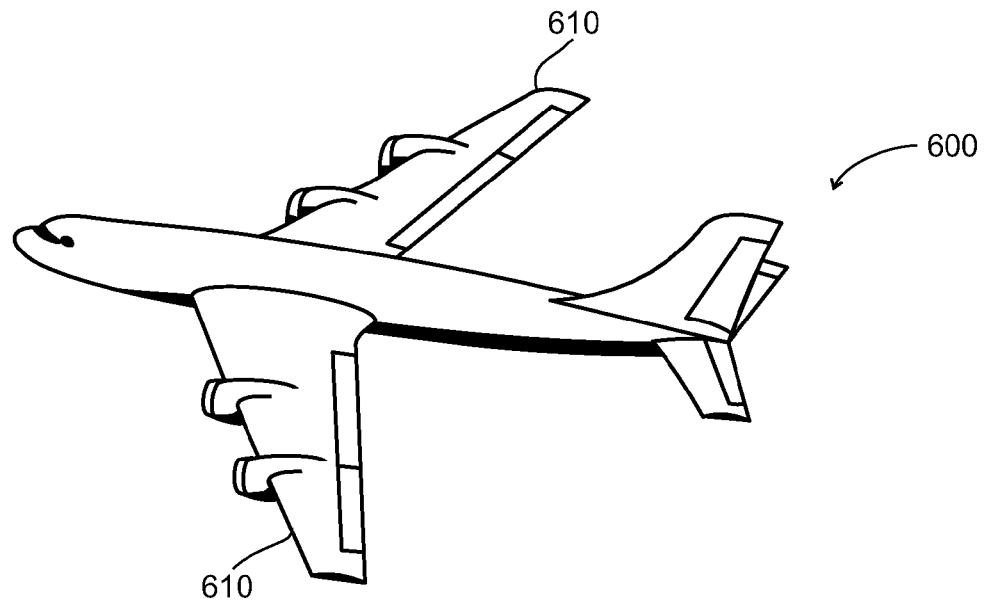
FIG. 6 is a schematic illustration of an airplane having one or more wings according to some embodiments of the invention.

FIG. 6 is a schematic illustration of an airplane 600 having one or more wings 610 according to come embodiments of the invention. Optionally, one or more of wings 610 includes a retrofit device according to one or more of the embodiments shown and described with respect to FIGS. 1-3. Alternatively or additionally, one or more of wings 610 are airfoils according to one or more of the embodiments shown and described with respect to FIG. 5 above. The retrofit devices and/or oscillatory vorticity generators are not shown in the figure for clarity. The installation of the retrofit devices and/or oscillatory vorticity generators with respect to a cross section of an airfoil such as wing 610 has been previously shown in FIGS. 1-3 and 5.

Figure 7:
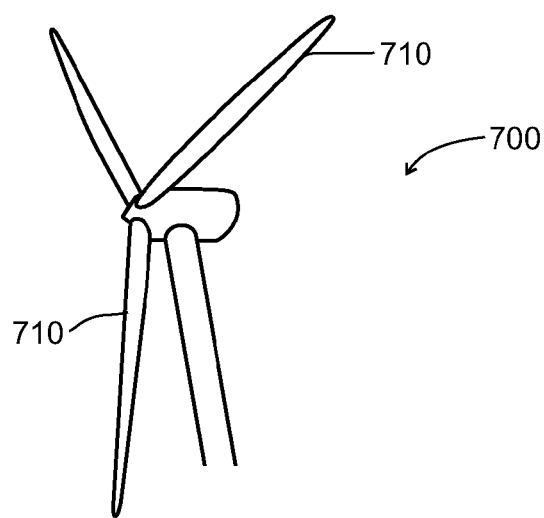
FIG. 7 is a schematic illustration of a wind turbine having one or more blades according to some embodiments of the invention.

FIG. 7 is a schematic illustration of a wind turbine 700 having one or more blades 710 according to some embodiments of the invention. Optionally, one or more of blades 710 include a retrofit device according to one or more of the embodiments shown and described with respect to FIGS. 1-3. Alternatively or additionally, one or more of blades 710 are airfoils according to one or more of the embodiments shown and described with respect to FIG. 5 above. The retrofit devices and/or oscillatory vorticity generators are not shown in the figure for clarity. The installation of the retrofit devices and/or oscillatory vorticity generators with respect to a cross section of an airfoil such as turbine blade 710 has been previously shown in FIGS. 1-3 and 5.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "an actuator" or "at least one actuator" may include a plurality of actuators.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "between" a first indicate number and a second indicate number and "from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An element comprising:
   at least one aerodynamic or hydrodynamic surface; and
   at least one oscillatory vorticity generator,
   wherein the at least one vorticity generator comprises:
      four side walls, having proximal and distal ends;
      a connector connecting the side walls at their proximal ends;
      wherein the walls and connector form a cavity within the element,
      wherein the distal ends of the walls are connected to an opening within the aerodynamic or hydrodynamic surface, and
      wherein two of the four walls are main walls, positioned opposite to each other; and
      at least one actuator mounted on at least one of the two main walls, such that when activated, the at least one actuator in conjunction with the at least one main wall produces oscillatory pressures within the cavity;
   wherein the opening in the aerodynamic or hydrodynamic surface is contiguous with the distal ends of the four walls.

2. The element according to claim 1, wherein said at least one actuator is a piezo-electric actuator.

3. The element according to claim 1 wherein a piezo-electric actuator is mounted on each of the two main walls.

4. The element according to claim 1, wherein the distance between the main walls is between 0.1 mm and 10 mm.

5. The element according to claim 1, wherein the distance between the main walls is between 0.5 mm and 1.5 mm.

6. The element according to claim 1, wherein the distance between the main walls is about 1 mm.

7. The element according to claim 1, wherein the two main walls are substantially parallel to each other.

8. The element according to claim 1, wherein the two main walls are substantially non-parallel to each other.

9. The element according to claim 1, wherein the aerodynamic or hydrodynamic surface is an airfoil.

10. An element comprising:
    at least one aerodynamic or hydrodynamic surface; and
    at least one wedge-shaped oscillatory vorticity generator;
       wherein the at least one wedge-shaped vorticity generator comprises:
          four side walls having proximal and distal ends;
          a connector connecting the walls at their proximal ends;
          wherein the walls and connector form a cavity within the element,
          wherein the distal ends of the walls are connected to an opening within the aerodynamic or hydrodynamic surface, and
          wherein two of the four walls are main walls which are positioned opposite to and non-parallel to each other forming a wedge shape, and
          wherein the distal end of the walls of the wedge shape are spaced apart further than the proximal ends; and
       at least one piezo-electric actuator mounted on at least one of the main walls, such that when activated, the at least one actuator in conjunction with the at least one main wall produces oscillatory pressures within the cavity.

11. The element according to claim 10, wherein the connector comprises a proximal wall.

12. The element according to claim 10, wherein the connector is a bonding element.

13. The element according to claim 12, wherein the bonding element comprises glue.

14. A retrofit device for an element having an aerodynamic or hydrodynamic surface, the retrofit device comprising:
an outer surface and an inner surface;
wherein the inner surface is adapted to conform to the aerodynamic or hydrodynamic surface and the outer surface comprises a new aerodynamic or hydrodynamic surface for the element;
at least one oscillatory vorticity generator associated with the outer surface;
wherein the at least one oscillatory vorticity generator comprises:
four side walls, having proximal and distal ends;
a connector connecting the side walls at their proximal ends;
wherein the walls and connector form a cavity within the element,
wherein the distal ends of the walls are connected to an opening within the aerodynamic or hydrodynamic surface, and
wherein two of the four walls are main walls, positioned opposite to each other; and
at least one actuator mounted on at least one of the two main walls, such that when activated, the at least one actuator in conjunction with the at least one main wall produces oscillatory pressures within the cavity;
wherein the opening in the aerodynamic or hydrodynamic surface is contiguous with the distal ends of the four walls;
at least one fastener adapted to attach the retrofit device to the element.

15. The retrofit device according to claim 14, wherein said at least one fastener comprises a sleeve adapted to cover the aerodynamic or hydrodynamic surface.

16. The retrofit device according to claim 14, wherein said at least one fastener comprises screws, glue, magnets or silicon.

17. A retrofit device for an element having an aerodynamic or hydrodynamic surface, the retrofit device comprising:
an outer surface and an inner surface;
wherein the inner surface is adapted to fit over the aerodynamic or hydrodynamic surface and the outer surface comprises a new aerodynamic or hydrodynamic surface for the element; and
one or more wedge-shaped oscillatory vorticity generators;
wherein the at least one wedge-shaped oscillatory vorticity generator comprises:
four side walls having proximal and distal ends;
a connector connecting the walls at their proximal ends;
wherein the walls and connector form a cavity within the retrofit device,
wherein the distal ends of the walls are connected to an opening within the new aerodynamic or hydrodynamic surface, and
wherein two of the four walls are main walls which are positioned opposite to and non-parallel to each other forming a wedge shape, and
wherein the distal end of the walls of the wedge shape are spaced apart further than the proximal ends; and
at least one piezo-electric actuator mounted on at least one of the main walls, such that when activated, the at least one actuator in conjunction with the at least one main wall produces oscillatory pressures within the cavity.

18. The retrofit device according to claim 14, further comprising one or more sensors for sensing the flow over the new aerodynamic or hydrodynamic surface.

19. The retrofit device according to claim 14, further comprising one or more controllers for controlling the at least one oscillatory voracity generator.

20. The retrofit device according to claim 14, further comprising conduits located between the inner and outer surfaces, wherein the conduits are configured to connect the oscillatory vorticity generators to power.

21. The element according to claim 1, wherein the element is a turbine blade.

22. A wind turbine comprising at least one wind turbine blade according to claim 21.

23. An aircraft having an aerodynamic surface comprising the element according to claim 1.

24. The retrofit device according to claim 14, wherein a longitudinal axis of the at least one oscillatory vorticity generator is perpendicular to the new aerodynamic or hydrodynamic surface.

25. The retrofit device according to claim 14, wherein an angle between a longitudinal axis of the at least one oscillatory vorticity generator and the new aerodynamic or hydrodynamic surface is between 10° to 170°.

26. The element according to claim 1, wherein the connector comprises a proximal wall.

27. The element according to claim 1, wherein a longitudinal axis of the at least one oscillatory vorticity generator is perpendicular to the aerodynamic or hydrodynamic.

28. The element according to claim 1, wherein an angle between a longitudinal axis of the at least one oscillatory vorticity generator and the aerodynamic or hydrodynamic surface is between 10° to 170°.

\* \* \* \* \*